United States Patent [19]

Bruhl et al.

[11] Patent Number: 4,873,863
[45] Date of Patent: Oct. 17, 1989

[54] VOLUMETRIC LEAK DETECTION MEANS AND METHOD

[76] Inventors: J. D. Bruhl, 2074 Audubon Dr., Glendale Heights, Ill. 60137; William R. Geisinger, 204 Parkchester Rd., Elk Grove, Ill. 60007

[21] Appl. No.: 277,314

[22] Filed: Nov. 29, 1988

[51] Int. Cl.⁴ .................. G01M 3/38; G01F 23/22
[52] U.S. Cl. ...................... 73/49.2; 73/293; 250/577
[58] Field of Search .............. 73/49.2, 293; 250/577; 33/125 A, DIG. 21

[56] References Cited

U.S. PATENT DOCUMENTS

| | | | |
|---|---|---|---|
| 3,741,656 | 6/1973 | Shapiro | 73/293 X |
| 4,365,165 | 12/1982 | Vedova | 250/577 |
| 4,373,815 | 2/1983 | Bruce | 73/49.2 X |
| 4,508,970 | 4/1985 | Ackerman | 73/293 X |
| 4,732,035 | 3/1988 | Lagergren et al. | 73/49.2 |

FOREIGN PATENT DOCUMENTS

| | | | |
|---|---|---|---|
| 53-3368 | 1/1978 | Japan | 73/293 |
| 609969 | 6/1978 | U.S.S.R. | 73/293 |
| 1004766 | 3/1983 | U.S.S.R. | 73/293 |
| 2147697 | 5/1985 | United Kingdom | 73/293 |

OTHER PUBLICATIONS

SRI International, Final Report, Sep. 1981, "Measurement of Small Leaks in Underground Gasoline Storage Tanks Using Laser Interferometry", Maresca, Jr. et al., pp. 7, 10, 23, 111–113, and 36–37..

Sensors, Sep. 1985, "Asporated Vapor Sensing for Leak Detection", Hanselka et al., p. 38.

Viatran Pressure Measurement Solutions, Viatran Corporation.

Primary Examiner—Tom Noland
Assistant Examiner—Joseph W. Roskos
Attorney, Agent, or Firm—Hill, Van Santen, Steadman & Simpson

[57] ABSTRACT

An apparatus for detecting volumetric leaks includes an arrangement for measuring linear displacement of a surface, including the surface of a liquid. The arrangement includes a beam generator for directing a collimated or coherent beam of energy onto a surface, a non-planar mirror to receive the beam as it reflects from the surface, and a receptor for receiving the beam as it is reflected from the mirror. Changes in position of a footprint of the beam on the receptor correlate to changes in displacement of the surface and accordingly, volumetric changes of a contained liquid. The non-planar mirror amplifies or exaggerates the changes in the position of the footprint relative to linear displacement of the surface so as to enable detection of small displacements of the surface.

16 Claims, 2 Drawing Sheets

VOLUMETRIC LEAK DETECTION MEANS AND METHOD

BACKGROUND OF THE INVENTION

1. Field of the Invention

The present invention generally relates to volumetric leak detection devices and methods and linear displacement detection devices and methods. More specifically, the present invention relates to a laser based linear displacement monitor that can be utilized to detect linear displacement of a surface and to detect linear displacement of a surface of a liquid in an enclosed volume to thereby detect any leak of the liquid from the volume.

2. Discussion of the Related Art

In 1985, the U.S. Environmental Protection Agency (EPA) estimated that there were approximately 3-5 million underground storage tanks containing hazardous substances or petroleum products in the United States alone. The EPA further estimated that approximately 100,000 tanks were leaking and that another 350,000 were expected to leak within the next five years.

It can be appreciated that substances and products leaking from such underground storage tanks present both an environmental and health hazard. The substances or products can leak into the ground and aquifers and the like, in the process contaminating same. Thus, it can be appreciated that such leaking underground storage tanks present a very serious problem.

On Sept. 13, 1988, the Environmental Protection Agency, charged with registering all underground storage tanks under the Resource Conservation Recovery Act, issued new rules to prevent leaks of petroleum and other toxic substances from underground storage tanks. Tank owners are required to furnish positive proof that a tank does not leak. The EPA estimated that only 5% of the affected tanks have leak detection systems.

One set of rules issued by the EPA applies to existing tanks, while another set applies to tanks installed after December, 1988. Tanks more than 25 years old must have leak detection systems installed within the next year, while newer tanks will have up to five years to meet such requirements.

The EPA is not alone in issuing rules designed to prevent and correct leaking of underground storage tanks containing toxic substances. Other countries throughout the world have also formulated legislation to ensure that tanks and contains, both above and below ground, be measured on a periodic basis to determine if they are leaking, thereby to determine the integrity of the tank.

The National Fire Protection Agency (NFPA), has established an optimum leak testing rate of 0.05 gallons per hour. See NFPA 329, *Underground Leakage of Flammable and Combustible Liquids*. However, such a sensitivity is difficult to attain, especially for tanks having a capacity of greater than 10,000 gallons.

The detection of leaking of tanks is called volumetric leak detection. A variety of systems have been employed to detect leaks in storage tanks.

Existing systems for detecting leaks include gauge systems such as float gauges, hydrostatic pressure columns and sonic or radar systems. However, such systems require difficult tank configurations during testing, such as a sealed tank, and a completely full tank. Additionally, these systems cannot attain an accuracy of plus or minus 0.05 gallons per hour.

Another method that has been used to detect volumetric leaks involves the use of a laser interferometer distance measurement system. In such system, a laser beam is reflected off of a corner cube reflector mounted on a float that floats on the surface of the substance in a tank. It has been indicated that in such a system leaks of about 0.1 gallons per hour were detectable.

A major problem with detecting volumetric leaks of substances such as petroleum products, is that for very small leaks, measurements must be made over a long period of time. However, during such period of time, a variety of influences can affect the measurement such as vaporization of a substance, vibration, temperature, and equipment response. Thus, it is very difficult to achieve more than a high degree of sensitivity, the ability to measure minute leas, utilizing prior art detectors.

To be sure, there are some volumetric leak detection systems that can attain a reasonable degree of accuracy in detecting small leaks. However, such systems generally are very elaborate and too expensive for small businesses and individuals.

SUMMARY OF THE INVENTION

The present invention provides a means and method for detection of linear displacement of a surface that can be employed for volumetric leak detection that is highly accurate and sensitive and relatively inexpensive to utilize. To this end, there is provided a linear displacement monitoring device that employs a collimated or coherent energy beam source, such as a laser beam source, to direct a beam onto a surface, such as a surface of a substance contained within a volume. The beam is directed onto the surface in such a manner that it is reflected therefrom. A receptor mounted in fixed relation to the beam source receives the reflected beam and detects the position of a footprint of a laser beam along the receptor. A change of position of the beam footprint along the receptor is interpreted as a change in the linear displacement of the surface of the substance. A change in the vertical linear displacement of the substance can be interpreted as a volumetric leak.

In an embodiment, the linear displacement monitoring device includes a reflector positioned to receive the beam reflected from the surface of the substance and to again reflect the beam onto the receptor. This provides for at least greater proportional change in the position of the footprint relative to displacement of the surface of the substance.

In a preferred embodiment, the reflector is a non-planar mirror so that a change in position of the footprint along the detector is amplified relative to displacement of the surface, i.e., the footprint changes in position in exaggerated proportion relative to displacement of the surface of the substance.

In yet another preferred embodiment, a plano lens is positioned at one end of a housing enclosing the beam source, reflector, and receptor such that the beam is transmitted through the plano lens onto the surface of the substance and then reflected back through the plano lens off of the surface of the substance and onto the reflector, the plano lens serving to isolate the beam source, receptor, and reflector from the substance.

It is an advantage of the present invention to provide a relatively inexpensive volumetric leak detector that is highly sensitive.

It is another advantage of the invention to provide a volumetric leak detector device that is easily constructed utilizing off-the-shelf components.

It is yet another advantage of the invention to provide a relatively inexpensive volumetric leak detector.

It is a further advantage of the invention to provide a volumetric leak detector that can be employed in storage tanks located above or below ground.

Additional features and advantages are described in, and will be apparent from, the detailed description of the presently preferred embodiment and from the drawings.

BRIEF DESCRIPTION OF THE DRAWINGS

FIG. 4 is an enlarged fragmentary view taken generally along the line IV—IV of FIG. 1.

DETAILED DESCRIPTION OF THE PREFERRED EMBODIMENT

Figure 1:
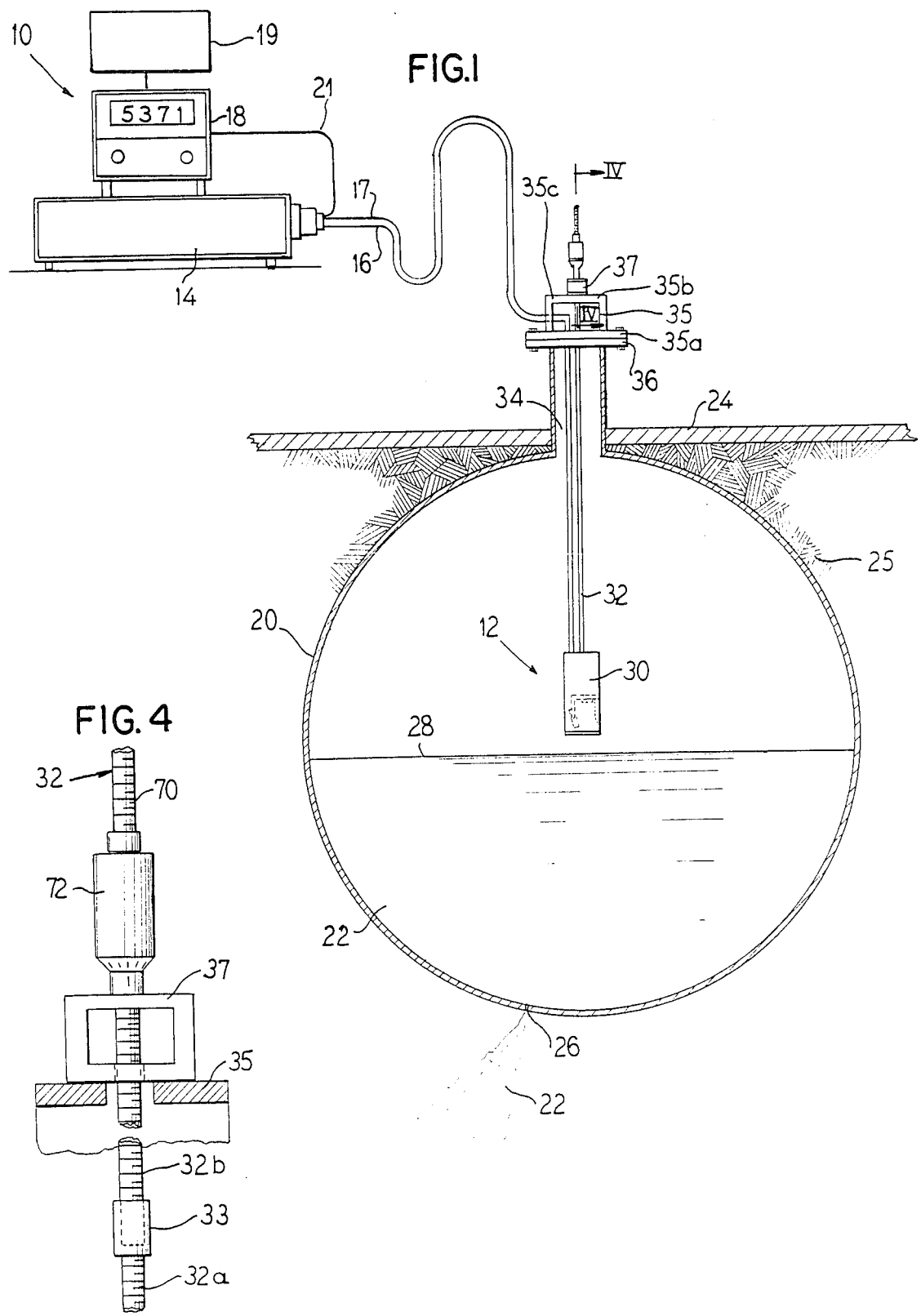
FIG. 1 is a diagrammatic illustration of the use of a device embodying principles of the invention illustrating the positioning of the device within a storage tank.

In FIG. 1 there is illustrated a linear displacement detection device 10 embodying principles of the invention. The device 10 is also known as a linear displacement monitor and is preferably utilized to detect volumetric leaks, preferably in storage tanks located either above or below ground. However, as will be appreciated, the linear displacement of any sufficiently reflective surface can be monitored utilizing the device 10.

As illustrated, the device 10 includes a detector module 12 and an associated electronic monitor or interpreter 14 coupled thereto by means of electrical cables 16 and 17. The electronic monitor 14 provides electrical signals to the detector module 12 over the cable 16 to enable the module 12 to detect linear displacement of a surface. The detector module 12, in turn, provides electrical signals over the cable 17 indicative of linear displacement of the surface. The signals are manipulated and interpreted by the monitor 14 which provides further electrical signals to a digital display 18 over a cable 21 so that displacement detected by the module 12 can be interpreted by attendant personnel. The display 18 provides information to a recording device 19, such as a printer or a magnetic storage device so that a permanent record of the output of the detector module 12 can be made.

As further illustrated, the detector module 12 is adapted to be positioned within a storage tank 20 that contains a substance 22. The storage tank 20 is illustrated as being an underground storage tank located below a surface 24 in the ground 25. However, it can be appreciated that the present invention can also be employed to detect leaks in above ground storage tanks.

Additionally, the storage tank 20 is illustrated as having a leak 26, whereby the substance 22 is escaping from within the storage tank 20 into the ground 25 surrounding the storage tank 20. It can be appreciated that as the substance 22 leaks from the storage 20, the level of a surface 28 of the substance 22 will vary. Accordingly, the surface level 28 will displace vertically downward.

The detector module 10 includes an optical chassis 30 that is positioned near the surface 28 so that any vertical displacement of the level of the surface 28 can be detected. The optical chassis 30 is supported on a micrometer adjustment insertion rod 32 that, in turn, is supported from an opening 34 of the tank 20 by means of a flanged cap member 35 that mates with a flange 36 of the opening 34. The flange cap member 35 includes a flange 35A and a cup-shaped cap 35B thereon.

It is understood that the micrometer insertion rod extends through an opening appropriately formed in the cap member 35B. A micrometer adjustment nut 37 supports the insertion rod 32 from a top surface 35C of the cap member 35B.

Figure 2:
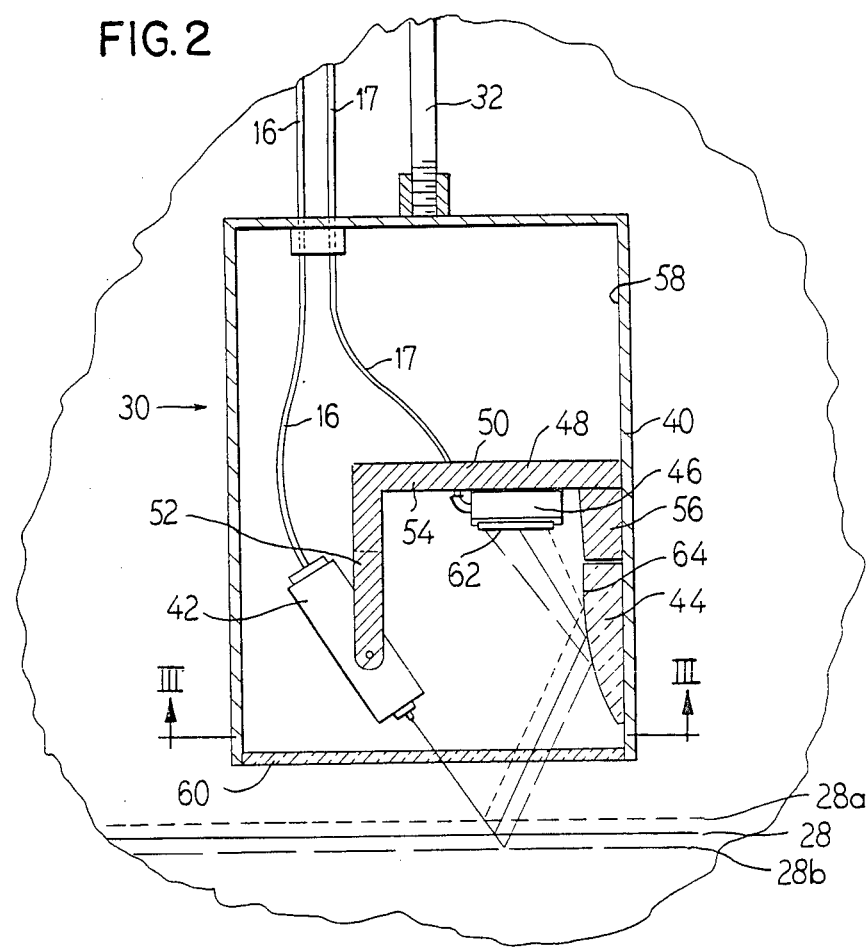
FIG. 2 is a cross-sectional elevational view of the device of FIG. 1.
Figure 3:
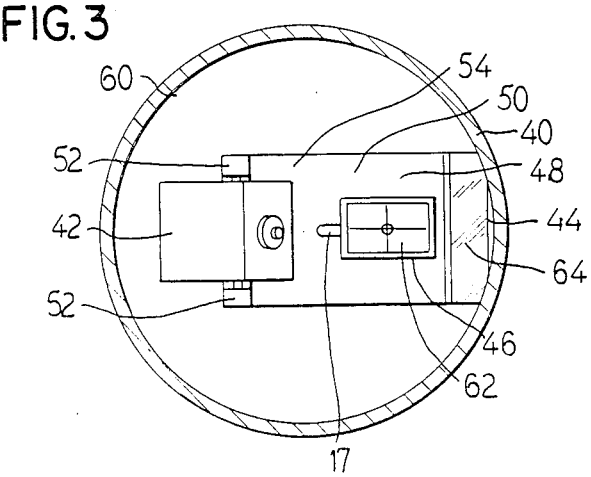
FIG. 3 is a bottom view of the device of FIG. 2 looking in the direction of the line II—II.

In FIGS. 2 and 3, the optical chassis 30 is illustrated in greater detail. Reference will now be made to these figures.

The optical chassis 30 includes a housing 40 that encloses a collimated or coherent energy beam source, such as a laser beam source or generator 42; a reflector, such as a mirror 44; and a receptor, such as a detector 46. A collimated energy beam is any energy beam that can be regulated to have its energy directed and concentrated along a column. An L-shaped mounting bracket 48 having a horizontally positioned plate member 50 and two downwardly depending arms 52 is used to support the laser beam generator 42 and the detector 46. The detector 46 is positioned on an underside 54 of the horizontally positioned plate member 50, while the laser beam generator 42 is supported between the two downwardly depending arms 52. The mounting bracket 48 further includes an additional supporting arm 56 to secure the mounting bracket 48 to an interior wall 58 of the housing 40. As illustrated, the mirror 44 is positioned along the interior wall 58 to which the mounting bracket 48 is attached.

As illustrated most clearly in FIG. 2, the end of the housing 40 facing the surface 28 of the substance 22 further includes a window or plano lens 60 secured thereon. The plano lens is so-called because it has planar surfaces on opposite sides thereof. The plano lens 60 protects the components within the interior of the housing 40 from splashes and corrosive vapors.

As also illustrated most clearly in FIG. 2, in operation, the laser beam generator 42 is caused to generate a laser beam that is directed through the plano lens 60 onto the surface 28 of the substance 22. The laser beam is reflected off of the surface 28 of the substance 22 back through the plano lens 60 and onto the mirror 44. From the mirror 44, the laser beam is reflected onto a light sensitive surface 62 of the detector 46. A laser beam footprint exists at the point where the laser beam shines on the detector light sensitive surface 62.

The inventors have discovered that a sufficient amount of the laser beam energy will reflect from the surfaces of most liquids so that the reflected beam can be detected. Accordingly, it is not necessary to place a reflective surface, such as a reflector cube, on the surface of the liquid. Hence, the present invention provides a leak detection device that is never in contact with the substance, the level of which is being measured. Further, the inventors have discovered that by utilizing a sufficiently fine collimated energy beam, the footprint of the reflected beam will be sufficiently small so that detection of small changes in position along a receptor is possible. Thus, the inventors have discovered how to use an energy beam in a non-contact manner to detect minute displacements of the surface of a liquid, especially in an enclosed volume.

As the level of the surface of the substance varies, as illustrated by the dashed lines 28A and 28B, the beam reflecting off of the surface 28 will impact the mirror at varying locations. Consequently, the beam reflected off of the mirror 44 will shine on the surface 62 of the detector 46 in varying locations. Accordingly, as the level of the surface 28 varies, the position of the laser beam footprint on the detector surface 62 will also vary. This variance of the position of the footprint on the detector surface 62 can be interpreted such that a vertical displacement of the surface 28 of the substance 22 can be ascertained.

To this end, the detector module 46 is so constructed that the position of the footprint of the laser beam therealong can be ascertained. The detector surface 62 preferably is a light receptor sensor such as a photo diode array. Also, preferably, the photo diode array comprises a 2 by 128 matrix of photo diodes. Such photo diode arrays are available off-the-shelf.

As illustrated in FIG. 2, the mirror 44 includes a non-planar surface 64 so that any variance or vertical displacement of the level of the surface 28 indicated by the reflected laser beam is amplified when the laser beam is reflected onto the detector surface 62. To this end, the mirror surface 64 causes changes in the position of the laser beam footprint to be exaggerated relative to the changes in the level of the surface 28. This enables the detection of minute changes in the vertical displacement of the level of the surface 28 of the substance 22. The surface 64 of the mirror 44 can be curved, ellipsoidal, parabolic, or oval. It is only important that the mirror 44 serve to amplify the changes of the angle of reflection of the laser beam.

It can be appreciated that the mirror 44 is an important, but not absolutely necessary, addition to the illustrated embodiment. Generally, if the detector 46 was positioned at the position of the mirror 44, the footprint of the beam on the detector 46 would vary in position in response to displacement of the surface 28 of the substance 22 by the rule of squares of the sides of right triangles. Thus, for example, given that A represents the distance from the beam source 42 to the surface 28 along the beam; B represents the distance from the vertical distance from the beam source 42 to the surface 28; and 2C represents the distance from the beam source 42 to the detector 46, then the footprint will generally change in position as the surface 28 displaces vertically downward such that twice the square of the change in footprint position is equal to the square of the change in the distance A less the square of the distance B. This is illustrated best by the diagram FIG. 5 and equations below:

$$A^2 = C^2 + B^2$$

$$C^2 = A^2 - B^2$$

$$\Delta C^2 = \Delta A^2 + \Delta B^2$$

Therefore, for every vertical displacement B, the footprint will change in position of $2 \times \Delta C$ or $2 \times (\Delta A^2 - \Delta B^2)$.

It can be appreciated that with a long distance A and a short distance B, i.e., minute vertical linear displacement but long beam path, the footprint will change in position by a large distance. However, the construction of a device which could perform such measurements would not be practical as the beam generator and receptor would have to be maintained separated by a great distance.

To avoid this problem, the inventors have employed the mirror or reflector 44 to increase the distance of travel of the collimated beam, but without increasing the distance separating the beam generator 42 and the detector 46. Additionally, the curved surface 64 serves to cause the beam footprint to change in position in exaggerated proportion relative to changes in the level of the surface 28 of the substance 22. Thus, minute changes in the level of the surface 28 are detectable utilizing devices contained within a small housing 40 that can fit within the opening of a storage tank.

As illustrated in FIGS. 2 and 4, the insertion rod 32 which supports the optical chassis 30 includes an end adapted to provide a micrometer adjustment. To this end, there is included a micrometer calibrated end 70 of the insertion rod 32 and a thimble 72 that can be rotated thereon in the known manner to raise and lower the insertion rod 32 and to make adjustments in the position thereof that are measured in micrometers.

As illustrated most clearly in FIG. 4, the insertion rod 32 can be formed out of a plurality of separate rod members such as the rod members 32A and 32B. The rod members such as the rod members 32A and 32B can be joined together by a coupling member 33 so that the insertion rod can be of any length, depending only on the number of individual rod members coupled together. This enables the deflector module 12 to be inserted into tanks of any depth.

In the preferred embodiment, the components of the device 10 are as follows:

(a) the digital output 18 is any suitable digital readout device that includes connected thereto output jacks for printing devices, storage devices and the like;

(b) the electronic monitor 14 is a suitable microprocessor based device utilized to interpret and fire the photo diode array surface 62;

(c) the insertion rod 32 is made of stainless bar stock having mounted thereon a conventional micrometer thimble and barrel;

(d) the housing 40 is cylindrically-shaped and made of stainless steel;

(e) the laser beam generator 42 is a collimated or coherent, narrow beam light source such as an HE-NE laser or a visible laser diode source; and (f) the plano lens is made of glass and has an outside diameter of 2 inches.

The preferred construction of remaining components have been described previously.

In operation, when a tank such as the illustrated tank is to be monitored, an initial dipstick reading of the tank 20 is made to provide an indication of the distance from the top of the tank opening 34 to the level of the surface 28 of the substance 22 therewithin. Then, the detector module 12 is inserted through the opening 34 in the tank. Preferably, an initial dipstick reading to within one inch of the level of the surface 28 is preferred. However, it is not essential.

The detector module 12 is lowered down, utilizing the micrometer insertion rod 32 to within one inch of the level of the surface 28 of the substance 22. At this point, power is provided to the optical chassis 30 so that the laser beam generator 42 generates a laser beam. Additionally, power is provided to the digital readout device 18 so that a digital readout is provided. A zero reading on the digital readout 18 indicates that the optical chassis 30 is so far from the surface 28 that the laser beam is reflecting off of the surface 28 at such an angle that it is not being reflected onto the mirror 44 and the detector 46.

The optical chassis 30 is then slowly drop further into the tank 20 using the micrometer thimble 72 on the insertion rod 32 until a reading appears on the digital output device 18. If, for some reason, the optical chassis 30 is allowed to drop further and to touch the surface 28 of the substance 22, the components therein are protected because the housing 40 is completely sealed due to the inclusion of the plano lens 60.

The detector module 12 is adjusted up or down from this position to obtain a center reading, i.e., a point at which loss or gain of the substance 22 can be determined, approximately one inch from the surface 28 of the substance 22. The detector module 12 then is allowed to sit stationary for about two hours. Previously calculated calibrations will correlate a change in the position of the laser beam footprint along the detector 46 with a change in the level of the surface 28 of the substance 22. For example, a reading change from 13 to 19 on the digital output 18 can indicate a change of 0.003 inches in the level of the surface 28 of the substance 22. This, in turn, can correlate to a loss of 30 fluid ounces of liquid over this time period in a typical 10,000 gallon tank which initially is 47 inches full.

It can be appreciated that a given detected vertical displacement can indicate any of a number of volumetric leaks. Depending on the fullness of the tank 20 prior to testing, more or less of the substance 22 will leak for a certain vertical displacement. Therefore, every detected vertical displacement must be interpreted in view of an initial measurement of the fullness of the tank 20.

Once the test is complete, the detector module 12 is removed from the tank 20 and the tank 20 is closed up. A two hour test should require only a total of approximately 2¼ hours. The fact that this test process is both non-contact and laser beam based, makes the process fully non-interfering.

It can be appreciated that any vibration, shocks or bumps in the level of the surface 25 of the substance 22 from external vibration and the like can be electronically averaged out or damped out by altering the frequency at which the electronic readout 18 updates. That is to say, many readings can be made and then averaged before the readout is updated. Further, a thermocouple positioned at another part of the tank can provide a reading of temperature change over the time period so that an adjustment for thermal contraction and/or expansion can be made.

While a preferred embodiment has been shown, modifications and changes may become apparent to those skilled in the art which shall fall within the spirit and scope of the invention. It is intended that such modifications and changes be covered by the attached claims.

We claim:

1. In a method of volumetric leak detection, the steps of:
   (a) directing a collimated beam of energy onto a surface of a liquid;
   (b) causing said beam to be reflected from said surface;
   (c) receiving said beam reflected from said surface with a reflector;
   (d) receiving said reflected beam from said reflector receptor;
   (e) detecting a position of a footprint of said beam on said receptor;
   (f) causing said footprint to change position in exaggerated proportion relative to changes in the level of said surface by means of a curved reflecting surface on said reflector;
   (g) detecting any changes of the position of said footprint;
   (h) correlating said changes in position of said footprint with changes in the level of said surface; and
   (i) correlating changes in the level of said surface with volumetric changes in said liquid.

2. In a method as set forth in claim 1, wherein said step of directing a collimated beam comprises directing a laser beam.

3. In a method of volumetric leak detection, the steps of:
   (a) positioning an apparatus containing a source for generating a collimated beam of energy and a receptor above a liquid surface in micrometer increments;
   (b) directing said collimated beam of energy onto the surface of the liquid;
   (c) causing said beam to be reflected from said surface;
   (d) receiving said reflected beam on said receptor;
   (e) detecting a position of a footprint of said beam on said receptor;
   (f) detecting any changes of the position of said footprint;
   (g) correlating said changes in position of said footprint with changes in the level of said surface; and
   (h) correlating changes in the level of said surface with volumetric changes in said liquid.

4. In a method of linear displacement detection, the steps of:
   (a) generating a collimated beam of energy onto a surface of a liquid;
   (b) directing said collimated beam onto a surface, the linear displacement of which is to be detected;
   (c) causing said beam to be reflected from said surface;
   (d) receiving said reflected beam on a reflector;
   (e) causing said beam to again be reflected;
   (f) receiving said again reflected beam on a receptor;
   (g) detecting a position of a footprint of said beam on said receptor;
   (h) detecting changes in position of said footprint along said receptor;
   (i) correlating changes in position of said footprint with linear displacement of said surface; and
   (j) causing said footprint to change position in exaggerated proportion relative to linear displacement of said surface.

5. In a method as set forth in claim 4, the step of generating a collimated beam comprising generating a laser beam.

6. In a method as set forth in claim 4, wherein said step of directing said beam onto a surface comprises the step of directing said beam onto a surface of a liquid.

7. In a method as set forth in claim 6, wherein said beam is directed at an angle to said surface.

8. An apparatus for detecting linear displacement of a surface; comprising:
   (a) generator means for generating a collimated beam;
   (b) means for positioning said generating means near said surface;

(c) receptor means for detecting said beam after it has been reflected from said surface;

(d) reflector means for again reflecting said beam reflected from said surface onto said receptor means;

(e) means for detecting a position of a footprint of said beam on said receptor means;

(f) amplifying means on said reflector means for causing said footprint to change in position in exaggerated proportion relative to linear displacement of said surface; and (g) display means coupled to said detector for displaying changes in position of said footprint of said beam on said receptor, said changes in position of said footprint being indicative of and correlated to linear displacement of said surface.

9. An apparatus for detecting linear displacement of a surface as set forth in claim 8, wherein said generator means is a laser beam generator.

10. An apparatus as set forth in claim 8, wherein said amplifying means comprises a curved reflective surface.

11. An apparatus for detecting volumetric leaks, comprising:

(a) an enclosed housing container having a transparent wall;

(b) means for suspending said housing container from an opening of a container so that said housing container is positioned above a surface of a liquid in said container;

(c) generator means for generating a collimated beam mounted within said housing container, said beam being directed through said transparent wall onto said surface of said liquid;

(d) receptor means for receiving and detecting said beam after it has been reflected from said surface;

(e) means for positioning said receptor means in fixed relation within said housing container relative to said generator means;

(f) means for detecting a position of a footprint of said beam on said receptor means; and (g) display means coupled to said receptor means for displaying relative changes in position of said footprint on said receptor means, said changes in position of said footprint being indicative of and correlatable to volumetric changes of said liquid.

12. An apparatus for detecting volumetric leaks as set forth in claim 11, further comprising:

(a) reflector means for receiving said beam as it is reflected from said surface and for again reflecting said beam onto said receptor means; and (b) means for positioning said reflector means in fixed relation to said generator means.

13. An apparatus for detecting volumetric leaks as set forth in claim 11, wherein said generator means is a laser beam generator.

14. An apparatus as set forth in claim 11, wherein said receptor means comprises a photo diode array.

15. An apparatus for detecting volumetric leaks as set forth in claim 11, wherein said reflector means includes amplifying means for causing said footprint to change in position in exaggerated proportion relative to displacement of said surface of said liquid.

16. An apparatus for detecting volumetric leaks as set forth in claim 15, wherein said amplifying means comprises a curved reflecting surface on said reflector means.

* * * * *

UNITED STATES PATENT AND TRADEMARK OFFICE
CERTIFICATE OF CORRECTION

PATENT NO. : 4,873,863　　　　　　　　　　　　　　　　　　　Page 1 of 2

DATED　　　 : Oct. 17, 1989

INVENTOR(S) : J. D. Bruhl, et al.

Figure 5:
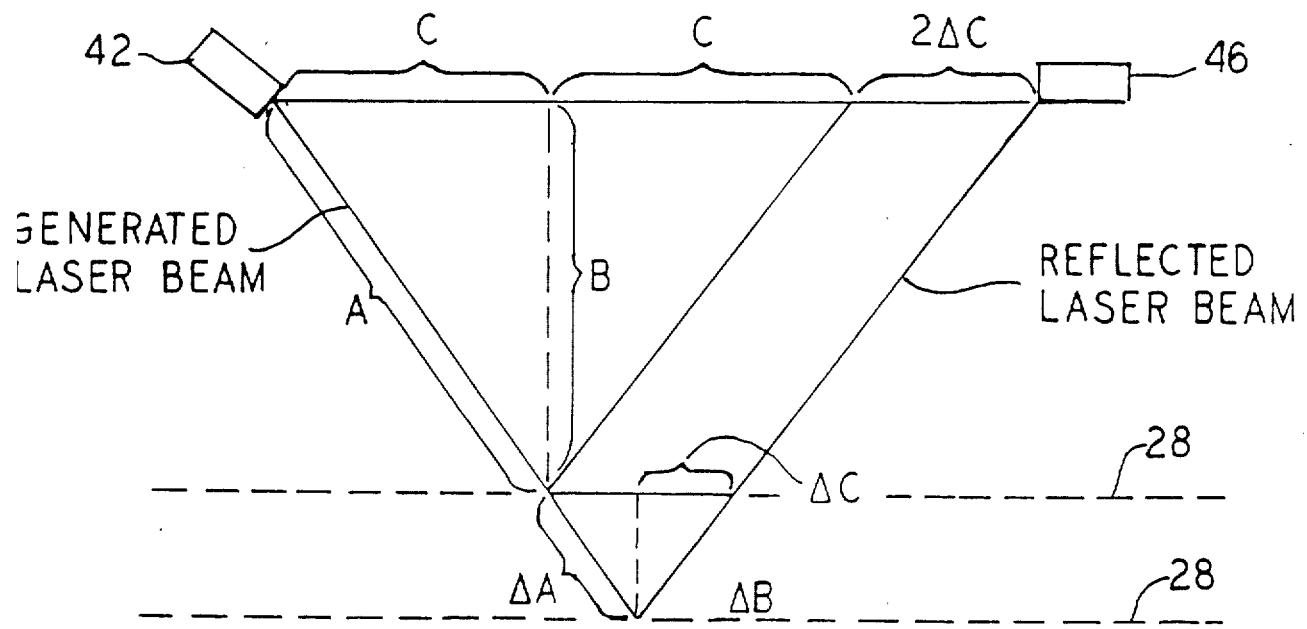
FIG. 5 is a diagram illustrating light beam reflection paths in the device of FIGS. 1-4.

It is certified that error appears in the above-identified patent and that said Letters Patent is hereby corrected as shown below:

The sheet of drawing consisting of Fig. 5, should be added as shown on the attached sheet.

Signed and Sealed this

Twentieth Day of March, 1990

*Attest:*

JEFFREY M. SAMUELS

*Attesting Officer*　　　　　　　　*Acting Commissioner of Patents and Trademarks*